March 31, 1942.   C. G. BUTLER   2,278,239
HOSE COUPLING
Filed Sept. 26, 1939

INVENTOR.
Clyde G. Butler
BY Wood & Wood
ATTORNEYS

Patented Mar. 31, 1942

2,278,239

UNITED STATES PATENT OFFICE 2,278,239

HOSE COUPLING

Clyde G. Butler, Cincinnati, Ohio, assignor to The Cincinnati Ball Crank Company, Cincinnati, Ohio, a corporation of Ohio Application September 26, 1939, Serial No. 296,642

1 Claim. (Cl. 285—84)

This invention relates to fittings of the type adapted to be attached to the end of hose formed of rubber or other compressible material. More particularly the invention relates to a coupling or a coupling and hose combination wherein the hose has its end disposed in an annular chamber of the fitting or coupling. The coupling may be said to include a central nipple entering the inside of the hose and an outer sleeve, coaxial with the nipple, surrounding the hose.

A great many patents have been issued on couplings of this general construction but these have not provided joints with the hose which would withstand the high pressures to which they are subjected in modern usage. The pressures in use range between five and ten thousand or more pounds per square inch and the test pressures up to twenty thousand points. Furthermore, the couplings have been expensive and have required extreme care and the appliance of high pressure in the process of attachment to the hose.

It has been the object of the present inventor to provide a coupling element fabricated and assembled in an extremely simple and highly efficient manner wherein the outer sleeve and the nipple are of different materials and are firmly and conveniently united during casting. Further it is provided that the die cast operation produces the complete fitting or coupling with the exception of some threading. The combination of parts cast together provides a hard nipple and a swageable outer sleeve compressible upon the end of the hose after insertion of the hose.

Additionally it has been the object of the inventor to provide a fitting or coupling and hose assembly wherein the interior rubber lining of the hose is not disrupted so that an effective seal exists along the irregular surface of the nipple and wherein the wire braiding within the rubber wall of the hose is in direct engagement with the irregular inner wall of the outer sleeve providing a connection preventing outward displacement of the hose under high pressure conditions. The combination therefore provides an inner rubber to metal seal and an outer metal to metal connection.

The outer sleeve is die cast of a zinc alloy having sufficient tensile strength for the purposes of strength and the proper ductility for permitting swaging upon the hose. The nipple includes annular grooves at its inner attachment end into which the metal is die cast for a rigid connection. Each groove also functions as a dam against leakage. The metal is forced into the mold at a pressure of approximately two thousand pounds per square inch and thereafter shrinks upon the nipple to constitute an extremely tight and substantially integral connection.

It has been discovered that it is a mistake to apply high swaging pressure to the outer sleeve. In this improved coupling the pressure used is just sufficient to press the grooved inner wall of the outer sleeve into the exposed wire braiding of the hose for a tight connection. Care is taken not to break or cut the inner rubber lining of the hose. It is forced, however, into the annular grooves of the nipple and constitutes a continuous rubber seal preferably including a series of dams resulting from the rubber pressed into the grooves and there is no opportunity for the fluid passing through the hose to pass between the nipple and hose wall.

Broadly speaking, as a result of these objects and concepts, a coupling has been produced which includes a nipple element fixed in axial internal relationship to a die cast sleeve by virtue of the operation of die casting the sleeve to the nipple. The method of producing the coupling is described and claimed in a copending application, filed on September 26, 1939, Serial No. 296,641.

Other objects and certain advantages will be more fully set forth in the description of the accompanying drawing in which.

Figure 1:
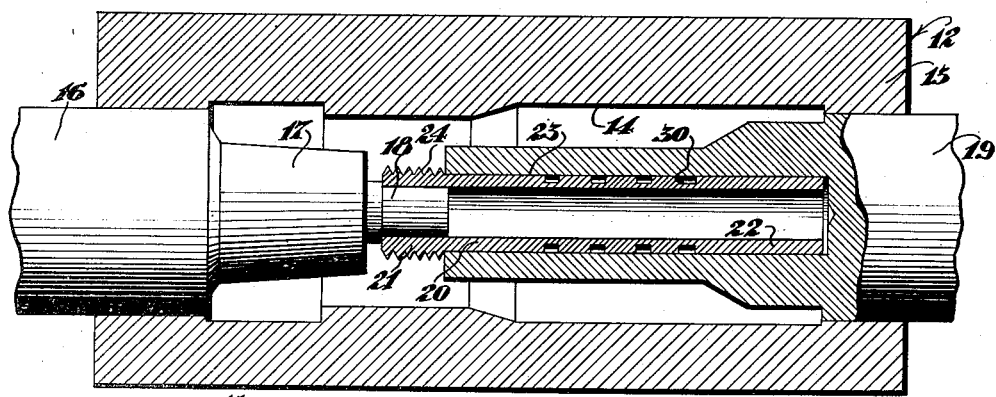
Figure 1 is a sectional view of the assembled elements of the die casting mold.

Referring to the drawing, the hose is generally indicated at 10 and the coupling at 11. As shown in Figure 1 the mold 12 is adapted to die cast the outer sleeve portion on the nipple.

The mold consists of three parts. The outer mold element 13 provides a substantially cylindrical chamber 14 providing the outer contour for the coupling including the usual head 15 adapted to be engaged by a wrench for screwing the coupling to the fitting or the adjacent hose section. An end mold element 16 plugs one end of the mold casing 13 and provides a tapered plug portion 17 in the mold cavity and a stud 18. All these members are in axial alignment. The other end of the mold cavity is closed by means of a mold element 19 also in the form of a plug. This element provides an interior extension of decreasing diameter and therefore spaced from the interior wall of the mold casing 13 to constitute, in conjunction with the plug portion 17, the space into which the die cast metal is poured and pressed.

The nipple 20 of the coupling is supported between the stud 18 and the element 19. The nipple is tubular and has its head end 21 fitting over the stud 18 and the remainder or shank portion 22 telescoped in the bore 23 of the mold element 19. The head end of the nipple is provided with annular grooves 24 of V-form. This head is exposed in the mold cavity and the die cast metal therefore is imbedded in the grooves and solidly attaches to the head. The metal is driven into the cavity at a pressure of two thousand pounds per square inch so that no porosity occurs. As the metal cools, it shrinks upon the head and the joint is exceedingly tight and leakproof, in fact the parts are substantially integral.

Figure 2:
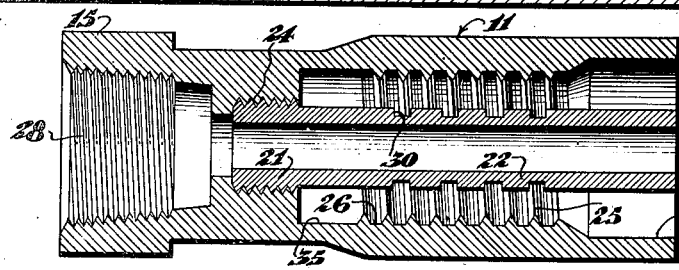
Figure 2 is a longitudinal sectional view of the die cast coupling.
Figure 3:
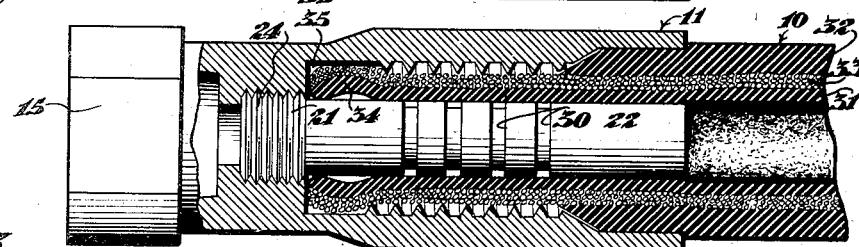
Figure 3 is a sectional view of the die cast coupling showing it in position to be fixed on the end of the hose.
Figure 5:
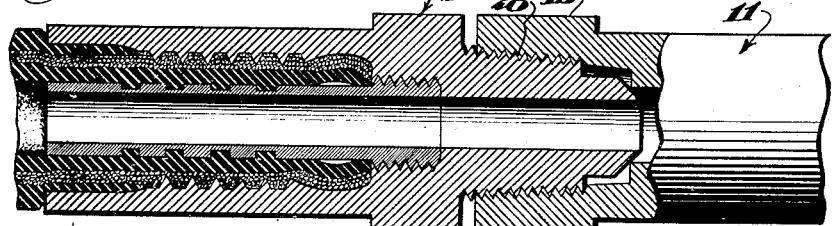
Figure 5 is a longitudinal sectional view of the coupling showing the coupling connected to the part to which it couples the hose.

Now referring to Figure 2, the die cast sleeve portion is screw threaded as at 25. These screw threads have a flat bottom and are provided along an intermediate portion 26. The annular recess 27 which receives the end of the hose is large enough to admit the hose end merely by the operation of hand pressing and screwing the parts together as shown in Figure 3. Also the attachment end of the coupling is tapped as at 28 for receiving the attachment nipple 29 (Figure 5) of the adjoining coupling. The nipple 20 includes a series of annular grooves 30 opposite the screw threading 25.

Figure 4:
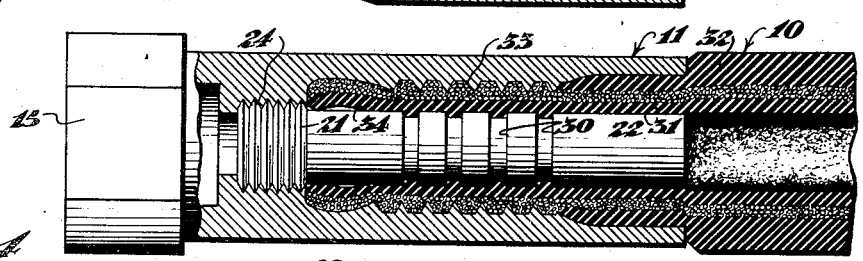
Figure 4 is a view taken similarly to Figure 3 but showing the coupling swaged in position on the hose.

The hose preferably used is essentially of rubber providing inner and outer layers of rubber indicated at 31 and 32 respectively, and an intermediate layer 33 of wire braiding. The outer layer of rubber 32 is stripped from the end of the hose engaging the screw threading 25 so that the wire braiding is in direct contact with the wire braiding. The sleeve portion of the coupling as initially formed increases in diameter over the extent of the screw threading to the hose receiving end thereof. When the swaging is performed, the portion of increased diameter is pressed toward the nipple upon the hose (Figure 4). This leaves the outer surface of the coupling substantially straight. The extreme inner end of the hose is subjected to very little pressure and forms a knob-like end 34 contained in the inner recess 35.

Now the amount of pressure applied and the ultimate spacing of the inner wall of the sleeve and the nipple are selected as to preclude rupture of the inner lining of rubber. The die cast zinc alloy metal is sufficiently ductile so as to be readily formable, and imbeds itself in the wire braiding along the screw threading. The screw threads are flat bottomed threads, and readily receive the wire braiding because they are of shallow depth.

The rubber lining enters the annular grooves 30. The condition provided may be described as a series of dams. As stated, the inventor has discovered that it is necessary to apply only sufficient pressure for tightly gripping the hose end. The continuous seal afforded by the rubber lining prevents the escape of the liquid under pressure along the wall of the nipple to the extreme inner end of the hose. As the liquid under pressure cannot reach the cavity 35, there is no tendency to force the hose out of the coupling. In this fact lies the effectiveness of attachment. The engagement of the screw threading and the wire braiding is sufficient to prevent displacement of the hose from the coupling in the absence of leakage to the chamber 35.

Having described my invention, I claim:

A hose coupling consisting of a nipple and a die cast sleeve element surrounding said nipple, said nipple having a series of annular grooves in its inner end, said inner end, including the grooves, cast within the die cast element, said sleeve element and nipple forming an annular recess, a hose including a layer of wire braiding and an inner layer of rubber, the end of said hose disposed in said recess and said die cast sleeve swaged into the wire braiding at a pressure insufficient to break the rubber lining disposed between the wire braiding and the nipple, whereby said annular grooves in the end of the nipple securely lock the nipple in position and constitute dams for preventing leakage between the die cast outer sleeve and the nipple.

CLYDE G. BUTLER.